United States Patent
Richards

(10) Patent No.: US 7,343,293 B1
(45) Date of Patent: Mar. 11, 2008

(54) RESPONDING TO REQUEST FOR DATA

(75) Inventor: Ted Richards, Los Gatos, CA (US)

(73) Assignee: Sony Corporation, Shinagawa-Ku, Tokyo (JP)

( * ) Notice: Subject to any disclaimer, the term of this patent is extended or adjusted under 35 U.S.C. 154(b) by 0 days.

(21) Appl. No.: 09/550,306

(22) Filed: Apr. 14, 2000

(51) Int. Cl.
*G06Q 99/00* (2006.01)

(52) U.S. Cl. .......................... 705/1; 705/14

(58) Field of Classification Search ............ 705/1, 705/14
See application file for complete search history.

(56) References Cited

U.S. PATENT DOCUMENTS

| | | | | | |
|---|---|---|---|---|---|
| 5,740,549 | A | * | 4/1998 | Reilly et al. | 705/14 |
| 5,848,396 | A | * | 12/1998 | Gerace | 705/10 |
| 5,933,811 | A | * | 8/1999 | Angles et al. | 705/14 |
| 6,144,944 | A | * | 11/2000 | Kurtzman et al. | 705/14 |
| 6,327,574 | B1 | * | 12/2001 | Kramer et al. | 705/14 |
| 6,327,609 | B1 | * | 12/2001 | Ludewig et al. | 709/203 |
| 6,332,127 | B1 | * | 12/2001 | Bandera et al. | 705/14 |
| 6,397,246 | B1 | * | 5/2002 | Wolfe | 709/217 |

FOREIGN PATENT DOCUMENTS

GB 2303238 A * 2/1997
WO WO 200058897 A2 * 10/2000

OTHER PUBLICATIONS www.audiohighway.com, Screen Print, Jan. 16, 1999.*
(Audio Highway Offers Broadcast Quality Radio Over the Internet for Free, Advertising Will Fund It, Computergram International, n3224, pCGN08130014, Aug. 13, 1997.*
"Audio Highway Launches Personalized News and Information Service," PR Newswire, p807LATH004, Aug. 7, 1997.*
"audiohighway.com To Acquire Mass Music, an Online Music Retailer, Acquisition will put audiohighway.com in the music e-commerce business." Business Wire, Apr. 14, 1999.*
"Audio Highway Releases AudioWiz 1.0," PR Newswire, p0323LAM031, Mar. 23, 1998.*
www.broadcast.com, retrieved from Internet Archive Wayback Machine <www.archive.org>, p. range: Dec. 1, 1998-Dec. 7, 1998.*

* cited by examiner

*Primary Examiner*—Jonathan Ouellette
(74) *Attorney, Agent, or Firm*—Kenyon & Kenyon LLP

(57) ABSTRACT

A user information item is associated with a data set selected by a user for delivery over an electronic network. The user's present and previous data selections are analyzed to identify a user information category related to at least one of these data selections, and the user information item is chosen from the identified user information category. User information items can be combined or associated with a video, animation or multimedia data set selected by a user for delivery over an electronic network.

2 Claims, 4 Drawing Sheets

RESPONDING TO REQUEST FOR DATA

BACKGROUND OF THE INVENTION

1. Field of the Invention

This invention relates to responding to requests for data and, more particularly, to adaptive provision of business announcements and related information in connection with audio and other data requested by a user.

2. Description of the Prior Art

Delivery of a variety of data including audio data, selected for downloading and playback by a user, over wide area networks such as the Internet provides new challenges and new opportunities for a commercial enterprise. One opportunity, and corresponding challenge, is use of the network contact with the user to provide other information, such as advertising and announcements of availability of related offerings, that may be of interest to the user, together with the data downloaded to the user's receiver. An approach that varies the user information items with the user's past and present choices of data has not been available heretofore.

OBJECTS AND SUMMARY OF THE INVENTION

An object of the invention is to provide a method and system that can analyze a user's current and previous choices, if available, of a variety of data including audio data and can determine which related information is appropriate to present to the user when the current choice of data is delivered to the user. Another object is to provide such a method and system with a capability of weighting the user's present and past choices of data so that recent trends in the user's choices and taste are given preferred treatment over older user's choices that have been supplanted by other types of choices. Preferably, a count should be kept so that the user is not presented with the same information more than a selected number of times.

The foregoing and other objects are attained in accordance with the invention by providing a method of responding to a request, the method comprising the steps of establishing a plurality of categories of potential requests and associating a plurality of sets of data with each of the categories. Then, in response to receipt of a request, one of the categories is related to the request, and a response is prepared including at least two sets of data from the related category.

In accordance with an independent aspect of the invention, there is provided a method of responding to a request, the method comprising the steps of establishing a plurality of categories of potential requests, associating a plurality of sets of data with each of the categories, and archiving successive requests from a given requester. Then, in response to receipt of a new request from the same requester, one of the categories is related to an archived request and the same or a different category is related to the new request. A response is prepared including at least two sets of data from at least one related category or at least one set of data from each of at least two related categories.

In accordance with another independent aspect of the invention, there is provided a system for responding to a request, the system comprising a store for data organized in a plurality of categories each including a plurality of sets of data and means responsive to receipt of a request for relating one of the categories to the request and preparing a response including at least two sets of data from the related category.

In accordance with another independent aspect of the invention, there is provided a system for responding to a request, the system comprising a store for data organized in a plurality of categories each including a plurality of sets of data, and means for archiving successive requests from a given requester. Means is provided responsive to receipt of a new request from the same requester for relating one of the categories to an archived request and the same or a different category to the new request and preparing a response including at least two sets of data from at least one related category or at least one set of data from each of at least two related categories.

In accordance with other independent aspects of the invention, a method and system are provided having the foregoing and other features.

The invention thus provides a system for noting and archiving user choices of data to be downloaded to a storage/playback unit. These user choices, past and present, are analyzed to estimate user interests. Each time a user chooses data for downloading and subsequent playback, the data chosen are analyzed and assigned to one or more "interest" categories. Optionally, the date and the number of selections that fall into each interest category are also noted and archived. Information on related subjects that may be of interest to the user is identified, based on the interest categories associated with the user's past and present data selections, and this information is presented to the user together with the data chosen by the user. Optionally, the system assigns weights to the user's present and past choices of data, weighting the present and most recent past choices more heavily, in order to emphasize developing trends in the user's taste. The number of times a provider's user information item is combined with any user's data selection can be accumulated and used for provider billing, monitoring or other purposes.

BRIEF DESCRIPTION OF THE DRAWINGS

A better understanding of the objects, features and advantages of the invention can be gained from the following description of the preferred embodiments thereof, in conjunction with the appended figures of the drawing, wherein.

DESCRIPTION OF THE PREFERRED EMBODIMENTS

Figure 1:
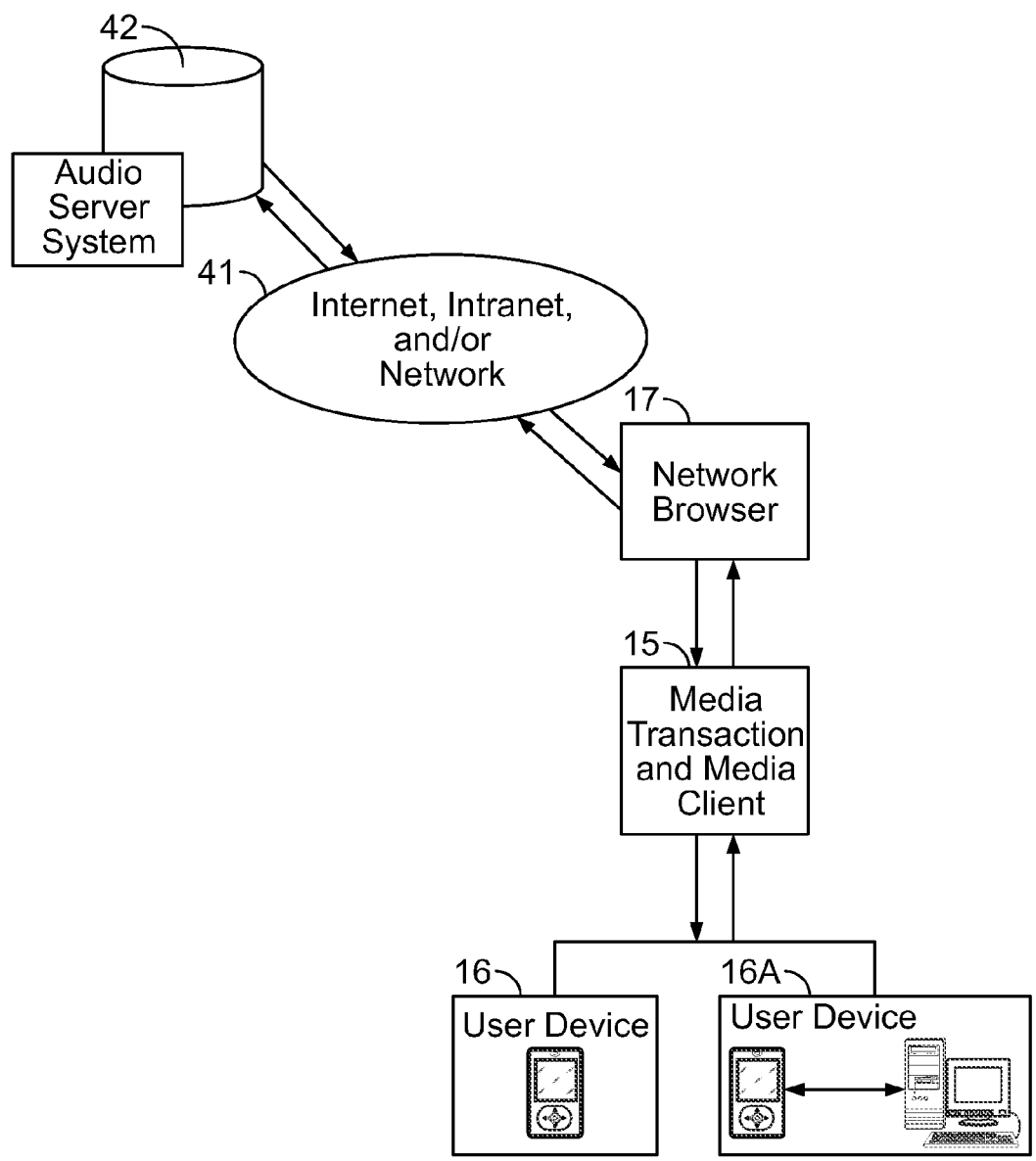
FIG. 1 is an overview of a system suitable for practicing the invention.

FIG. 1 is an overview of a system for practicing a preferred embodiment of the invention, relating to a user's request for audio data. A media transaction and media client device 15 provides an interface between user devices 16 and 16A, such as a hand-held device, a computer or other audio data repository, and a network browser 17. The browser 17, in turn, provides an interface to a wide area network 41, such as the Internet. The network 41 is connected to an audio server 42 that receives user audio data requests, extracts the requested audio data from one or more audio databases, combines the requested audio data with user information, pulled from another database, and assists in downloading the combined audio data and user information for the user's consumption at the user device 15. Preferably, use of the media transaction and media client device 15 and network browser 17 is transparent to the user.

Figure 2:
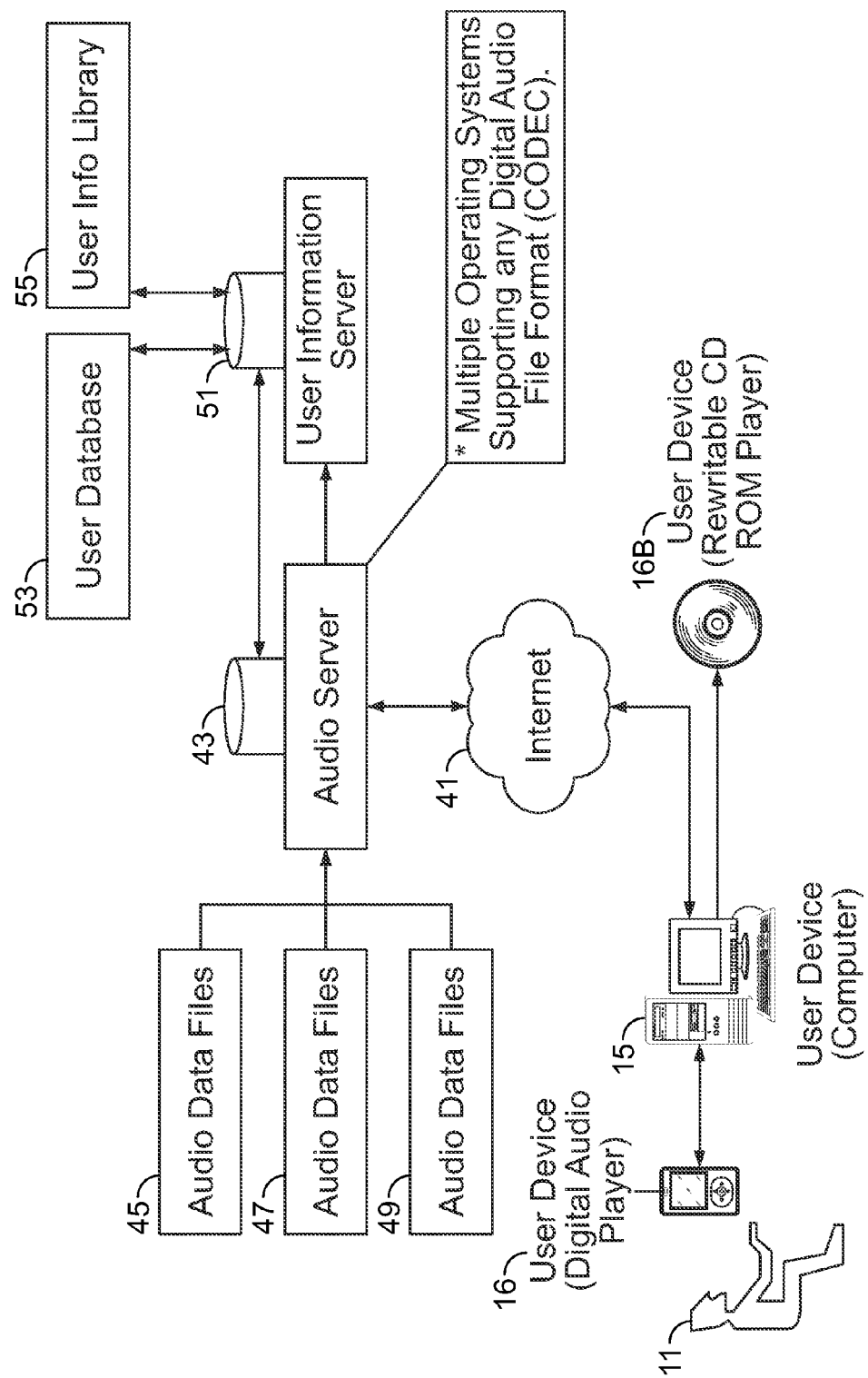
FIG. 2 is a schematic view illustrating use of the invention in one embodiment.

FIG. 2 illustrates one use of the invention. A user or subscriber 11 carries a portable storage and (optional) playback unit (PSPU) 16 that may be connected to a media transaction and media client device 15, such as a user computer or other audio data receptor. The media client device 15 is optionally connected to a playback device 16B, such as a CD ROM player/recorder. The SPSU 13 may be a conventional diskette (optionally including a diskette playback device), a CD ROM diskette (optionally including a CD ROM playback device) or any other suitable portable audio data storage medium and (optional) playback device for the storage medium. The media transaction and media client device 15 may be a user computer, a relatively "dumb" terminal that receives audio data and directs these data to the SPSU 13, or a multiple operating system device that accepts and supports two or more different digital audio file formats, using a CODEC or other suitable multiple format recognition system.

The media transaction and media client device 15 is connected through a browser and through a wide area network, such as the Internet (shown as a "cloud" 41), to an audio server 43. The audio server 43 is connected to one or more audio databases 45, 47, 49 that contain audio data selections, each selection being specified by an indicium or other identification symbol. The audio server 43 is also connected to a user information server 51 that includes a user database 53 and a user information library 55 containing a plurality of user information, preferably provided in the same audio format as the audio data items in the database 45. In one embodiment of the invention, the user database 53 identifies each user who has previously used the audio server 43 to download at least one audio data selection. Each time the user 11 requests and downloads one or more audio data selections using the audio server 43, the user database 53 analyzes the user's selections and assigns each such selection to one or more user interest categories, discussed in the following. Each individual user interest category, or selected set of user interest categories, has a corresponding set of user information contained in the user information library 55.

A new user will not yet have established a user interest category (or set thereof), and the user information database optionally uses only this user's current (and first) audio data selection to identify one or more user interest categories for this user for the user database 53. A user who has previously downloaded one or more audio data selections using the system will have one or more user interest categories (or set thereof) already established within the user database 53.

After the user 11 has indicated the present audio data selections, the audio data server combines the user's audio data selections with one or more user information items from the user information library 55, based on the user's currently identified user interest category (or set thereof), and downloads this combined set of data from the audio databases) 45 through the audio data server 43, through the Internet 41 to the user computer 15. The user 11 optionally plays back an audio data selection using the personal computer 15 or downloads the audio data selection to the SPSU 16 or 16B for subsequent playback at a convenient time. When an audio data selection is played back by the user 11, the playback system will also play back the associated user information item(s) that were combined with this audio data selection by the audio data server 43.

Figure 3:
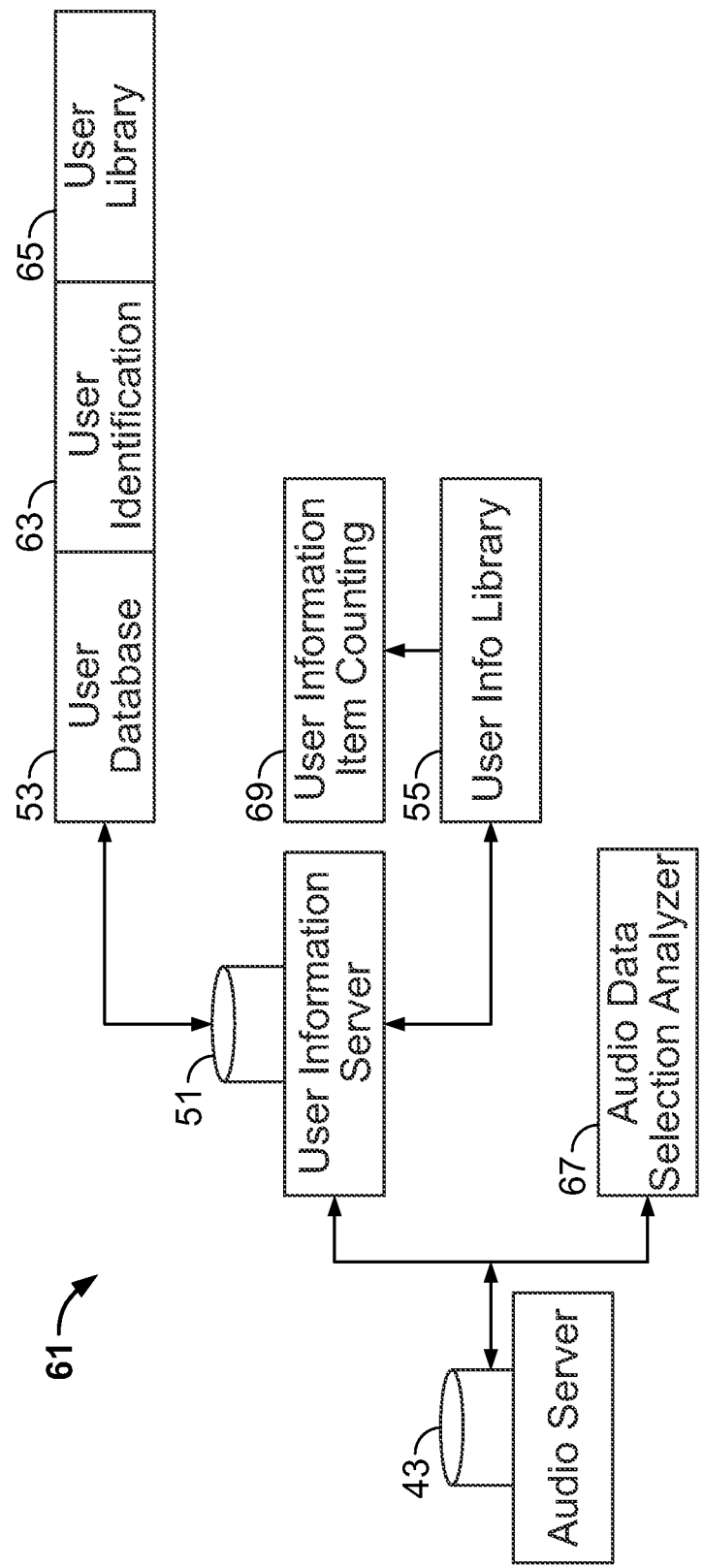
FIG. 3 is a schematic view of apparatus for identification of a user interest category according to the invention.

FIG. 3 schematically illustrates apparatus 61 suitable for user identification and analysis of a user audio data selection, to associate the user with one or more user interest categories with associated user information items. The apparatus 61 includes a user information server 51, which is connected to an audio data server 43 (not shown in FIG. 2) and to a user information database 53. The user information database 53 includes a user identification module 63 that receives the user ID and user audio data request and determines whether the present requesting user name or identifying indicium is already in a user library 65, based on previous audio data requests by this user. If this user name or identifying indicium is not already in the user library 65, the user's name or indicium is added to the list of users (or their indicia) in the library. The user's audio data selections are now received and examined by an audio data selection analyzer 67. The analyzer assigns each audio data selection to one or more user interest categories, based on the subject matter in the audio data selected, and each user interest category is given an additional mark or count corresponding to this most recent audio data selection. Optionally, the date this most recent audio data selection was received is recorded together with the mark or count for the corresponding user interest category. An example of categories of potential requests from users is set forth in the following, which includes political, economic and cultural/social news categories, music categories and a miscellaneous or default category that corresponds to audio data selections that have no match in any other user interest category I. News
  A. Political
    1. Domestic only
      a. Local and/or regional
      b. Statewide and/or national
    2. Foreign Only
      a. Focus on specified country
      b. Focus on specified region
    3. Domestic and Foreign
  B. Economic
    1. Domestic
      a. Securities markets
      b. Fiscal and monetary policy
      c. Focus on companies in specified area
      d. Focus on companies in specified geographic region
    2. Foreign
      a. Securities markets
      b. Fiscal and monetary policy
      c. Focus on specified country or region
  C. Cultural and social
    1. Local Events and Developments
    2. National Events and Developments
    3. Foreign Events and Developments
    4. Arts
    5. Entertainment
II. Music
  A. Current popular
  B. Older popular
  C. Semi-classical
  D. Classical
    1. Pre-Baroque
    2. Baroque
    3. Romantic
    4. Modern
    5. Operas
    6. Operettas
    7. Lieder
    8. Ballet and Other Dance Music III. Technology
  A. Telecommunications
  B. Electronics and related technologies
  C. Space exploration and colonization
  D. Manufacturing and operations
  E. Transportation and automotive vehicles
  F. Chemical technology
  G. Biotechnology
IV. Miscellaneous (default; cannot be matched elsewhere)

The categories can be selected in accordance with the invention from the group consisting of the ones set forth above, or from subgroups thereof.

In a first approach, each user interest category that has accumulated at least a selected number (e.g., 1 or 5) of marks or counts, from past and present audio data selections made by this user, has at least one corresponding user information item associated with the user audio data request. The user information item, obtained from a user information library 55 that is connected to the audio data selection analyzer 67, is combined with the corresponding audio data selection and is delivered to the user's computer 15 as indicated in FIG. 1. The user information item may be related advertising of a product (goods and services) that may be of interest to this user, based on the user's past and present audio data selections; may be one or more announcements of new audio data selections that have recently become available; or may be some other information that is related to the user's past and present audio data selections. Preferably, no more than a modest number of user information items, such as between 3 and 9, are included with an audio data selection that has a length of no more than 30 minutes.

In a second approach, each mark or count for a user interest category is dated, and each accumulated mark or count is weighted according to when the corresponding audio data selection was made by the user. For example, each audio data selection can be assigned a non-negative selection integer i, which is incremented by one (i--->i+1) each time another audio data selection is received by the audio data server 43 (FIG. 1). This selection integer is also assigned to the mark or count c(i) of the user interest category corresponding to the audio data selection number i; c(i)=1 if the audio data selection has an affirmative mark or count for this user interest category; otherwise, c(i)=0. A non-negative weight w(i) is also assigned to the audio data selection number i, where the sequence of weights {w(i)} is preferably monotonically increasing (to weight recent selections more heavily) and is preferably (re)normalized so that the sum of the weights is equal to a selected, fixed number, such as 1. The most recent audio data selection, and the corresponding mark or count for each associated user interest category, is thus assigned the highest selection integer, denoted I. A weighted number $$S = \sum_{i=1}^{I} w(i)c(i) \quad (1)$$

is then compared with a selected threshold value $S_{thr}$. If $S \geq S_{thr}$, user information from the corresponding user interest category is combined with the audio data selected by the user; if $S < S_{thr}$, this user information is not combined with the audio data selected by the user. This second approach weights the marks or counts so that more recent "hits" for the corresponding user interest category are given greater importance. Among other things, this second approach tends to give stronger emphasis to recent trends in the user's taste in audio data selections.

In a third approach, which can be combined with the first or second approach, a given user information item, corresponding to a particular user interest category, can be deleted from the group of user information items that are combined with the user's audio data selection if this given user information item has already been combined with earlier audio data selections for this user at least a threshold number of times. This reduces the possibility that a given user information item will become "shopworn" for this user. A user information item can "expire" and be replaced by one or more other user information items, from the same provider or from a different provider.

In a fourth approach, a selected and fixed set of user information items is combined with the audio data selections for delivery to the user, ignoring the nature of the particular selections made by the user.

In an alternative or supplemental approach, a user or subscriber to the audio data service may be required to complete a user information sheet, indicating the types of audio data that the user is presently interested in downloading. Some of the questions to be answered by the user may be keyed to a list of user interest categories, such as the preceding list, and each interest category checked off by the user may be assigned one or more marks or counts. Optionally, these initial marks or counts may also be discounted with the passage of time, using a discounting or weighting algorithm such as Eq. (1).

Figure 4:
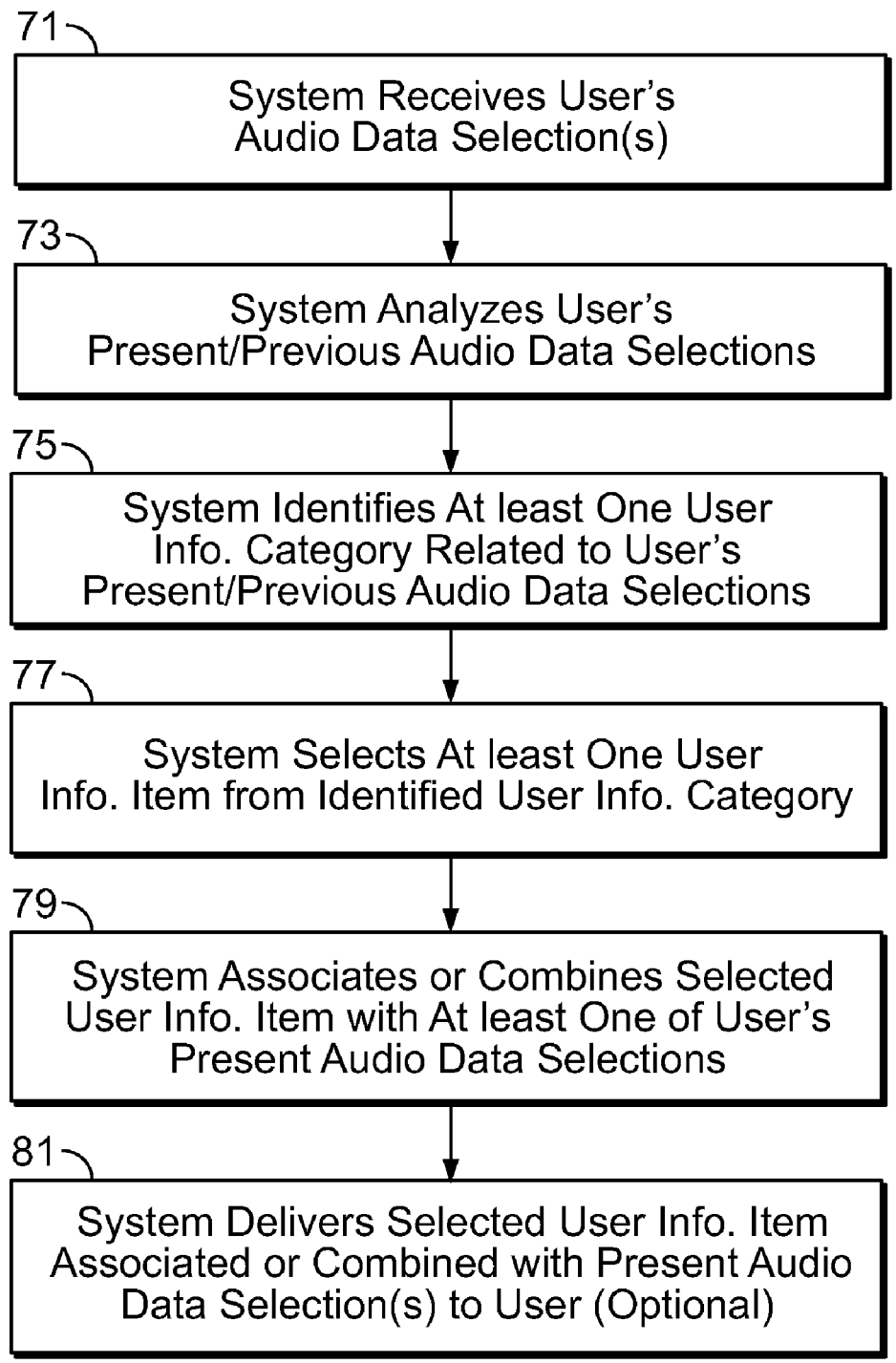
FIG. 4 is a flow chart illustrating a method for practicing the invention.

FIG. 4 is a flow chart illustrating practice of the invention in one embodiment. In step 71, the system receives a user's audio data selection(s). In step 73, the system analyzes the user's present audio data selection and, if available, previous audio data selections, with reference to at least one user information category. In step 75, the system identifies at least one user information category that is related to at least one of the user's present or previous audio data selections. In step 77, the system selects at least one user information item from an identified user information category. In step 79, the system relates, associates or combines the selected user information item with at least one of the user's present audio data selections. In step 81 (optional), the system delivers the user's audio data selection, associated or combined with the selected user information item.

Some of the audio data selections made by the user may have restrictions associated with the selection. For example, a particular music, literary or dramatic selection may be registered with the American Society of Composers, Authors and Playrights (ASCAP) and may require payment of a small sum to ASCAP each time the work is performed (here, equated with selection for downloading by the user). Each audio data selection to which an ASCAP or other restriction applies can be accounted for in a separate counting process, and required payments or reports for that selection can be made periodically to the responsible agency.

Combination of one or more user information items with an associated audio data selection, for delivery as an integrated audio data unit to the user, may be implemented using a transfer protocol such as TRANZACT.DLL, which connects to the audio data server and allows establishment of a "pipe" between server and user that satisfies the requirements of the audio content provider and of the user information provider (for example, an advertiser). TRANZACT.DLL works at the (user) computer level and at the server level.

The Audio Server API primarily uses eight commands for export of server function, each command having an appended prefix, "AhAs", indicating an use of an audio server. These commands, which can be added to as the server activities are expanded, are the following.

AhAsInitialize. This command initializes the audio server private data structures maintained by the API. No parameters are required. The command returns True, if the API is successfully initialized and returns False otherwise.

AhAsOpenConnection. This command opens a connection to the audio server, using the user name and password. Required parameters are szUserName (a pointer to a null-terminated string containing the user's name) and szUserPassword (a pointer to a null-terminated string containing the user's password; this password may be a transformed version of the user's selected password). The command returns Connection_Handle (a 32-bit alphanumeric quantity), if the connection is successfully opened, and returns Null or Zero otherwise.

AhAsCloseConnection. This command closes a connection identified by the passed Connection_Handle. This call will also delete any resources that were allocated for the connection. A required parameter is the Connection_Handle that identifies the connection to be closed. The command returns Void if the connection is successfully closed and No Return Value otherwise.

AhAsGetFile. This command downloads a specified file, using a SendMessage call to the passed HWND to indicate progress in the download process. The required parameters are three Connection_Handle indicia: szRemoteFileName (a pointer to a null-terminated string that contains the file name on the remote machine, which is to be downloaded), szLocalFileName (a pointer to a null-terminated string that contains the file name on the local machine, which is the file to be created by the download), and hStatusWind (a handle for a Window to which status or progress is reported). The returns are an unsigned long, which is the count of the bytes transfer-red (successful) and Null or Zero (otherwise). This call will also release any resources that were allocated for the connection.

AhAsGetFileWithCallback. This command is a second version of the Get File command, to be used by an application written in C or C++, where it is relatively easy to define a callback function. Return parameters are connection (a handle for an open connection), szLocalFileName (a pointer to a null-terminated string that contains the file name on the local machine, which is the file to be created by the download), and pStatusFunc (a pointer to a status function that is called to report status or progress). The returns are an unsigned long, which is the count of the bytes transferred (successful) and Null or Zero (otherwise).

AhAsGetShoppingCart. This command retrieves the "shopping cart" or current download list for the user identified by the passed connection. The list is written to a file in a format to be defined. At a later time, this function, or a variant thereof, may return an array of records. Required parameters are connection (a handle for an open connection) and szLocalFileName (a pointer to a null-terminated string that contains the file name on the local machine, which is the file to be created by the download). The Returns are True, if successful, and False, otherwise.

AhAsCurDownloadMetric( ). This command retrieves from the server a metric that indicates the server's current download performance. The units of the metric can be kilobytes per second, megabytes per minute, or some other unit that the application can use to more accurately estimate the amount of time a given download will require. No parameters are required, and the Return is a Download Metric, a 32-bit quantity to be defined.

AhAsServerStats. This command fills in a Server_Status structure, passed as a parameter, with the value(s) that indicate(s) the current status of the audio server. The Server_Status structure is to be defined. The function is used primarily for diagnostics and debugging. A required parameter is pServerStats (a pointer to a server status record). The Returns are Void and No Return Value.

At the user end, a network browser 17 (FIG. 1), such as Netscape or Microsoft Explorer, preferably provides a connection between the network and the user's media transaction and media client device (e.g., a computer employed by the user to download audio data selections). The screens and command or dialog buttons provided for the user may have any reasonable format and can be developed using Microsoft Development Toolkit or any other suitable tools for input of information by, and presentation of information to, the user.

Audio file client software must be installed at the user's computer before an audio file can be requested, downloaded from the audio server and played back. This software is installed between the browser, or network-interface, and the user's computer or other audio data receptor device, to facilitate a user's request for downloading of audio data and to provide whatever user information is appropriate and available to facilitate choice of one or more user information items to associate with the audio data requested by the user.

A transfer protocol preferably also includes a separate counting module 69 (FIG. 3) that accumulates the number of times, within a selected time interval, such as one month, that each user information item is combined with any user's audio data selection. The output of this counting module 69 can serve as the basis for an accounting report to the provider of this user information item, for provider billing, monitoring or other purposes.

The preceding discussion has focused on downloading of a user's request for selected audio data and associating with, or appending to, this audio data one or more user information items, selected with reference to information on the user contained in a user database that is queried whenever a user audio data request is received. The audio data may be replaced by video data, animation data or multimedia data requested by the user, with an appropriate change being made in the format of the user information item(s) appended to the audio/video/animation/multimedia data requested by the user. That is, the appended user information item(s) are preferably presented in the same format (audio or video or animation or multimedia) in which the user requested data are presented to the user.

The preferred embodiments of the invention described above relate primarily to the case where audio data are involved. The invention is clearly applicable, however, to cases involving other kinds of data.

Thus there is provided in accordance with the invention a novel and highly effective system and method for adaptive provision of business announcements and related information in connection with audio and other data requested by a user. The embodiments of the invention described above are merely exemplary, and the invention extends to all embodiments thereof that fall within the scope of the appended claims.

The invention claimed is:

1. A method for providing user information related to a user's selection of audio data, the method comprising the steps of:
receiving a user's selection of audio data and an indicium identifying the user;

analyzing the user's present selection of audio data and previous selections of audio data, and identifying at least one user interest category based on the user's present and previous audio data selections;

selecting at least one user information item from the at least one identified user interest category;

associating or combining the at least one user information item with the user's audio data selection; and delivering the associated or combined at least one user information item and the user's audio data selection to the user over an electronic network, wherein said step of analyzing and identifying comprises the steps of:

assigning each of said user's present audio data selections and said user's previous audio data selections to said at least one user interest category, assigning each of said user's present audio data selections and each of said user's previous audio data selections an approximate time at which said audio data selection was received, assigning each of said audio data selections a weighting factor that decreases as the difference between a present time and the approximate time at which said audio data selection was received, multiplying the numerical value of an assignment to each of said at least one user interest category by a corresponding weighting factor to produce a numerical value for a weighted assignment to each of said at least one user interest category, and counting the numerical value of the weighted assignment to each of said at least one user interest category; and when the accumulated number of weighted assignments to a selected one of said at least one user interest category is greater than a selected threshold number, identifying the selected one of said at least one user interest category as a category from which said at least one user information item is selected.

2. A system for providing user information related to a user's selection of audio data, the system comprising:

an audio data server that receives a user's selection of audio data and an indicium identifying the user;

a user information server that analyzes the user's present selection of audio data and previous selections of audio data, that identifies at least one user interest category based on the user's present and previous audio data selections that selects at least one user information item from the at least one identified user interest category, and that associates or combines the at least one user information item with the user's audio data selection; and an audio data delivery system that delivers the associated or combined at least one user information item and the user's audio data selection to the user over an electronic network, wherein said user information server assigns each of said user's present audio data selections and said user's previous audio data selections to said at least one user interest category, assigns each of said user's present audio data selections and each of said user's previous audio data selections an approximate time at which said audio data selection was received, assigns each of said audio data selections a weighting factor that decreases as the difference between a present time and the approximate time at which said audio data selection was received, multiplies the numerical value of an assignment to each of said at least one user interest category by a corresponding weighting factor to produce a numerical value for a weighted assignment to each of said at least one user interest category, and counts the numerical value of the weighted assignment to each of said at least one user interest category; and when the accumulated number of weighted assignments to a selected one of said at one user interest category is greater than a selected threshold number, said user information server identifies the selected one of said at least one user interest category as a category from which said at least one user information item is selected.

* * * * *

UNITED STATES PATENT AND TRADEMARK OFFICE
CERTIFICATE OF CORRECTION

PATENT NO. : 7,343,293 B1  Page 1 of 1
APPLICATION NO. : 09/550306
DATED : March 11, 2008
INVENTOR(S) : Ted Richards It is certified that error appears in the above-identified patent and that said Letters Patent is hereby corrected as shown below:

Title page, Item [54] and Column 1, Line 1
Change the title from "RESPONDING TO REQUEST FOR DATA" to
-- RESPONDING TO REQUESTS FOR DATA --

Column 10, line 33, change "said at one user" to -- said at least one user --

Signed and Sealed this

Second Day of June, 2009

JOHN DOLL
*Acting Director of the United States Patent and Trademark Office*